(12) United States Patent
Chou

(10) Patent No.: US 10,977,171 B2
(45) Date of Patent: *Apr. 13, 2021

(54) METHOD FOR CREATING MULTI-NAMESPACE AND ACCESSING DATA THEREIN

(71) Applicant: Silicon Motion, Inc., Jhubei (TW)

(72) Inventor: Po-Sheng Chou, Jhubei (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/672,536

(22) Filed: Nov. 4, 2019

(65) Prior Publication Data
US 2020/0065242 A1 Feb. 27, 2020

Related U.S. Application Data

(62) Division of application No. 15/804,797, filed on Nov. 6, 2017, now Pat. No. 10,565,103.

(30) Foreign Application Priority Data
Dec. 29, 2016 (TW) .................................. 105143898

(51) Int. Cl.
*G06F 12/02* (2006.01)
*G06F 12/1009* (2016.01)

(52) U.S. Cl.
CPC ...... *G06F 12/0246* (2013.01); *G06F 12/1009* (2013.01); *G06F 2212/1044* (2013.01); *G06F 2212/1056* (2013.01); *G06F 2212/2022* (2013.01); *G06F 2212/657* (2013.01); *G06F 2212/7201* (2013.01); *G06F 2212/7202* (2013.01)

(58) Field of Classification Search
CPC ...... G06F 3/0604; G06F 3/0638; G06F 3/064; G06F 3/0679; G06F 12/0246; G06F 12/1009; G06F 2212/1044; G06F 2212/1056; G06F 2212/2022; G06F 2212/657; G06F 2212/7201; G06F 2212/7202
See application file for complete search history.

(56) References Cited

U.S. PATENT DOCUMENTS

| 9,015,446 | B2 * | 4/2015 | Cox | G06F 12/0284 |
| | | | | 711/206 |
| 2013/0227201 | A1 * | 8/2013 | Talagala | G06F 3/0679 |
| | | | | 711/103 |
| 2017/0344430 | A1 * | 11/2017 | Greer | G06F 11/1456 |

FOREIGN PATENT DOCUMENTS

CN 101751371 A 6/2010

* cited by examiner

*Primary Examiner* — Aracelis Ruiz

(57) ABSTRACT

A method for creating a multi-namespace includes steps of: returning information of a namespace data structure according to a query command from, wherein the information of the namespace data structure comprises a maximum number and a total capacity of supportable namespace; receiving and determining whether a create command for creating a plurality of namespaces is correct, wherein the create command comprises a number of a namespace and a capacity of the namespace; and if the determination is correct, creating a global host logical-flash physical address (H2F) mapping table according to the create command, wherein a number of the global H2F mapping tables is independent of the maximum number of the supportable namespaces and the number of namespace. A method for accessing data in a multi-namespace is also provided.

6 Claims, 5 Drawing Sheets

| H2F mapping table#0 | |
|---|---|
| LBA | Block Page |
| 0 | |
| 1 | |
| 2 | |
| ... | |
| 16383 | |

| H2F mapping table#1 | |
|---|---|
| LBA | Block Page |
| 0 | |
| 1 | |
| 2 | |
| ... | |
| 16383 | |

| H2F mapping table#2 | |
|---|---|
| LBA | Block Page |
| 0 | |
| 1 | |
| 2 | |
| ... | |
| 16383 | |

| H2F mapping table#3 | |
|---|---|
| LBA | Block Page |
| 0 | |
| 1 | |
| 2 | |
| ... | |
| 16383 | |

FIG. 3
(prior art)

| LBA | Block | Page |
|---|---|---|
| 0 | | |
| 1 | | |
| 2 | | |
| ⋮ | | |
| 16383 | | |
| 16384 | | |
| 16385 | | |
| ⋮ | | |
| 32767 | | |
| 32768 | | |
| 32769 | | |
| ⋮ | | |
| 49151 | | |
| 49152 | | |
| 49153 | | |
| ⋮ | | |
| 45535 | | | the first sector: LBA 0 – 16383
the second sector: LBA 16384 – 32767
the third sector: LBA 32768 – 49151
the fourth sector: LBA 49152 – 45535

FIG. 4

METHOD FOR CREATING MULTI-NAMESPACE AND ACCESSING DATA THEREIN

CROSS-REFERENCE TO RELATED APPLICATIONS

This application is a divisional application of U.S. application Ser. No. 15/804,797, filed on Nov. 6, 2017, the entire contents of which are incorporated herein by reference.

FIELD OF THE INVENTION

The present invention relates to a technique for data access, and more particularly to a method for creating a multi-namespace and a method for accessing data in a multiple-namespace.

BACKGROUND OF THE INVENTION

Conventionally, a non-volatile storage medium supports only a single logical partition, which is referred to as a single logical device, and data access or data management is performed on the non-volatile storage medium according to a host logical-flash physical address (H2F) mapping table. However, the 2012 version of the non-volatile memory express (NVMe) standard supports logical partitioning of non-volatile storage medium. Each area generated by logical partition is called a namespace, and each namespace can be regarded as a logical device. Since the 2012 version of the NVMe standard does not provide any specification on the creation of namespaces and H2F mapping tables, the control unit in the data storage device may create a corresponding H2F mapping table for each namespace for data management purposes, and records the correspondence relationship between the logical block address (LBA) of a host and a physical address of the nonvolatile memory (hereunder correspondence) in each H2F mapping table. The external access command includes a specific and unique namespace identifier (namespace ID) corresponding to the namespace and the LBA. The control unit in the data storage device can access the data stored in a specific namespace according to the above information and update the H2F mapping table of the namespace accordingly, thereby achieving data access and management.

However, such data access method has significant deficiencies. For example, the control unit needs to partition the overall resource of the non-volatile storage medium based on the total number of namespaces, and manage all resources within the corresponding namespace for each H2F mapping table. The plurality of H2F mapping tables may increase the difficulty and complexity of management of non-volatile storage medium, and the flexibility of management of non-volatile storage medium is also reduced due to that the resources of the namespaces are not sharable with one another. Therefore, there is a technical need to maintain the flexibility of data management of non-volatile storage medium while supporting multi-namespace.

SUMMARY OF THE INVENTION

One objective of the present invention to provide a method for creating a multi-namespace capable of maintaining the flexibility of data management of non-volatile storage medium while supporting multi-namespace.

Another objective of the present invention to provide a method for accessing data in a multi-namespace corresponding to the above-described method.

The present invention proposes a method for creating a multi-namespace, which includes steps of: returning information of a namespace data structure according to a query command from, wherein the information of the namespace data structure comprises a maximum number and a total capacity of supportable namespace; receiving and determining whether a create command for creating a plurality of namespaces is correct, wherein the create command comprises a number of a namespace and a capacity of the namespace; and if the determination is correct, creating a global host logical-flash physical address (H2F) mapping table according to the create command, wherein a number of the global H2F mapping tables is independent of the maximum number of the supportable namespaces and the number of namespace.

The present invention further provides a method for accessing data in a multi-namespace, which includes steps of: receiving an access command of a namespace, wherein the access command comprises a namespace identifier (namespace ID) and address data; mapping the namespace ID and the address data to a logical block address (LBA) of a global H2F mapping table; and executing the access command according to the LBA.

Since the present invention uses a global H2F mapping table to collectively manage a plurality of namespaces in a data storage device, not only the multi-namespace is effectively supported but the management of multi-namespace is also facilitated. Further, the present invention prevents system resources (e.g., spare spaces) from being partitioned for supporting the multiple namespaces, thereby avoiding the insufficiency or limiting of the system resources.

BRIEF DESCRIPTION OF THE DRAWINGS

Other advantages, objectives and features of the present invention will become apparent from the following description referring to the attached drawings.

FIG. 3 are H2F mapping tables created by a controller unit of the prior art;

FIG. 4 is a global H2F mapping table created by a control unit in accordance with an embodiment of the present invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
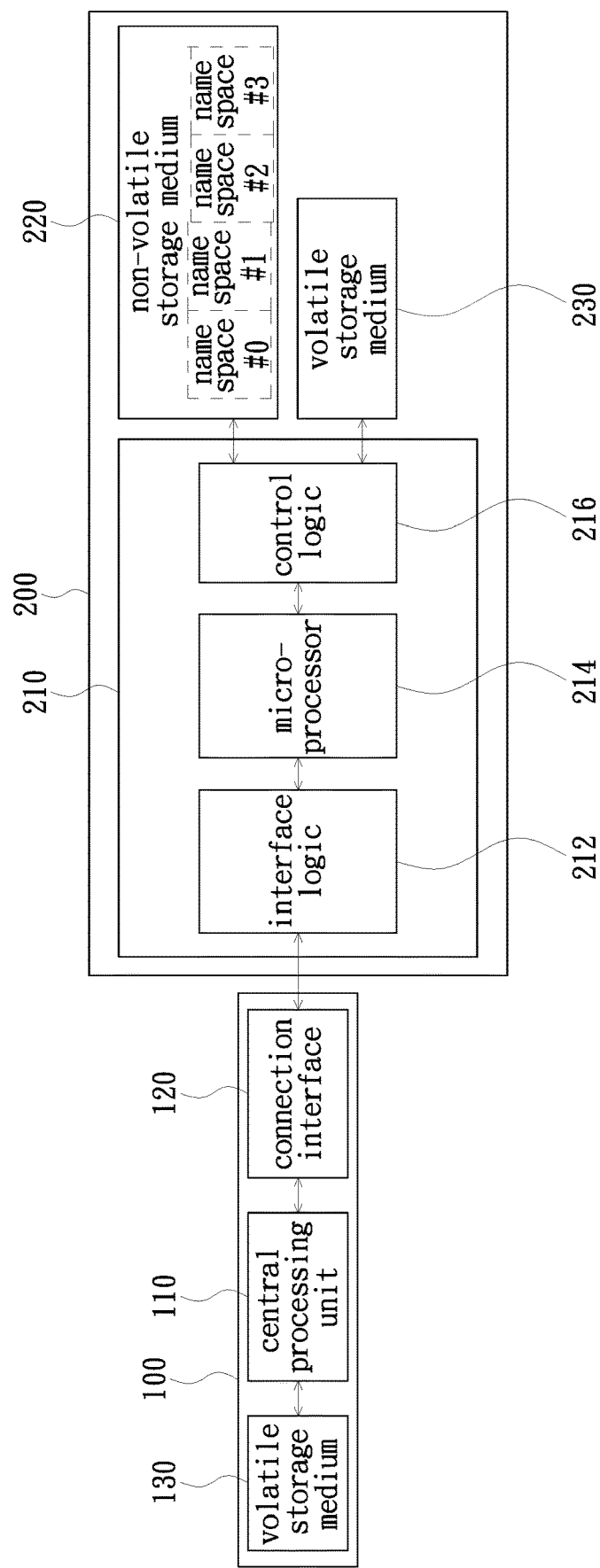
FIG. 1 depicts a data storage device in accordance with an embodiment of the present invention and its electrical coupling relationship with a host.

FIG. 1 depicts a data storage device in accordance with an embodiment of the present invention and its electrical coupling relationship with a host. Referring to FIG. 1, the host 100 mainly includes a central processing unit 110, a connection interface 120 and a volatile storage medium 130. The connection interface 120 is adapted to electrically couple the data storage device 200 of the present embodiment. The central processing unit 110 is configured to transmit commands to the data storage device 200 via the connection interface 120. For example, the central processing unit 110 transmits a read command to the data storage device 200 so that the data storage device 200 reads data at a designated address of the volatile storage medium 130. In the present embodiment, the host 100 is implemented by a computer, a mobile phone, a tablet computer, a camera or other handheld electronic device having computing function.

The data storage device 200 mainly includes a control unit 210, a non-volatile storage medium 220 and a volatile storage medium 230. The control unit 210 is electrically coupled to the non-volatile storage medium 220 and the volatile storage medium 230. The control unit 210 is configured to control the operation (e.g., data access or data erase) of the non-volatile storage medium 220 and the volatile storage medium 230. In the present embodiment, the non-volatile storage medium 220 is, for example, a flash memory, a magnetoresistive random access memory (RAM), a ferroelectric RAM or a resistive RAM (RRAM) capable of long-term data storage; and the volatile storage medium 230 is, for example, a dynamic random access memory (DRAM) or a static random access memory (SRAM). The control unit 210 mainly includes an interface logic 212, a microprocessor 214 and a control logic 216. The microprocessor 214 is electrically coupled to the interface logic 212 and the control logic 216. The microprocessor 214 is configured to access data in the non-volatile storage medium 220 and the volatile storage medium 230 via the control logic 216. Further, the microprocessor 214 is configured to receive commands, data or messages to read commands at a specified address of the volatile storage medium 130 from the host 100 via the interface logic 212. The aforementioned commands are, for example, a write command, a read command or a flush command. Then, the control unit 210 is configured to execute the command to access data.

Figure 2:
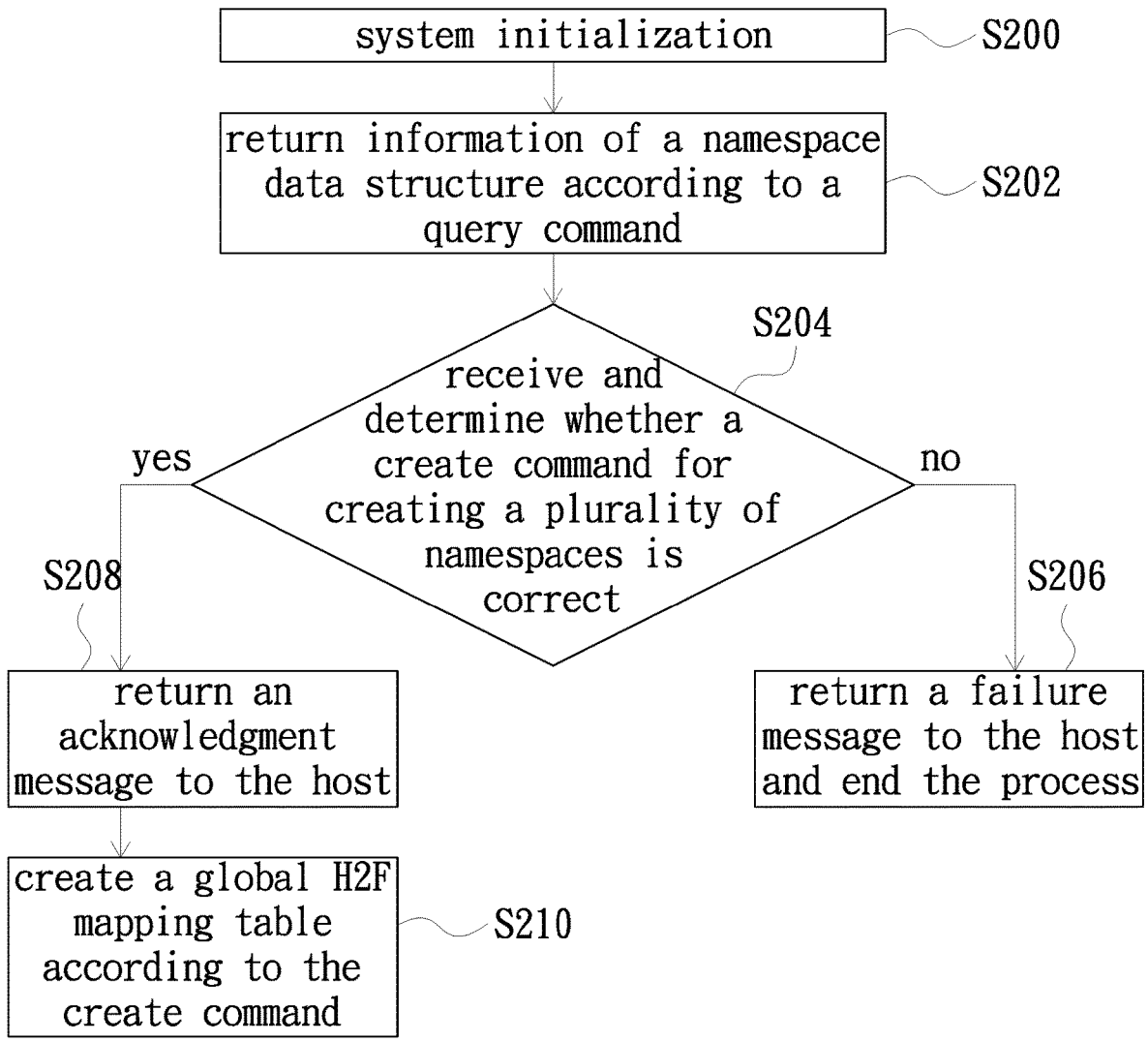
FIG. 2 is a flowchart of a method for creating a multi-namespace in accordance with an embodiment of the present invention.

FIG. 2 is a flowchart of a method for creating a multi-namespace in accordance with an embodiment of the present invention. Please refer to FIGS. 1 and 2. First, step S200: starting system initialization. Specifically, the data storage device 200 is initialized when it is electrically coupled to the host 100 for the first time.

Step S202: returning information of a namespace data structure according to a query command, wherein the information of the namespace data structure includes the maximum number and the total capacity of supportable namespaces. Specifically, the host 100 transmits an identify command to the control unit 210 of the data storage device 200. The control unit 210 returns the information of the namespace data structure to the host 100 according to the identify command. The information of the namespace data structure includes support parameters, such as the maximum number of supportable namespaces of the data storage device 200 and the maximum size of the supportable namespaces. In addition to returning the namespace data structure to the host 100, the control unit 210 may return the information of a controller data structure to the host 100 according to the same identify command or another identify command.

Thereafter, step S204: receiving and determining whether a create command for creating a plurality of namespaces is correct, wherein the create command includes set values of a namespace number and each of namespace capacities. If the determination in step S204 is NO, then step S206: returning a failure message to the host 100 and ending the process of the method for creating a multi-namespace of the present invention. Alternatively, if the determination in step S204 is YES, then step S208: returning an acknowledgment message to the host 100. Specifically, after receiving the namespace data structure, the host 100 may generate a create command according to its actual needs and output the create command to the control unit 210 of the data storage device 200. The create command includes set values such as the total number of namespaces that the host 100 asks to create and the capacity of each namespace to be created, wherein the total number of namespaces that the host 100 asks to create is greater than or equal to two. After receiving the create command, the control unit 210 compares the set values included in the create command with the support parameters included in the namespace data structure to determine whether the create command is correct. For example, the control unit 210 determines whether the namespace number indicated in the set values is smaller than or equal to the maximum number of supportable namespaces indicated in the support parameters, or whether the sum of the capacity of each namespace indicated in the set values is smaller than or equal to the total capacity of supportable namespaces indicated in the support parameters. In addition, the set values may further include a namespace size and a formatted logical block addresses (LBAs) size. In addition, in the support parameters and the set values, the value relating to the space size and space capacity is preferably expressed by the number of LBAs. For example, assuming that the amount of data corresponding to one LBA is 4 KB and accordingly the capacity of the 16,384 LBAs is 64 MB, then the namespace size and namespace capacity may be expressed as 64 MB, or preferably as 16,384 LBAs. If the determination in step S204 is NO, the control unit 210 returns a failure message to the host 100 and ends the process of the method for creating the multi-namespace of the present invention. Alternatively, if the determination in step S204 is YES, the control unit 210 returns an acknowledgment message to the host 100. It is to be noted that in step S204, the control unit 210 returns only an acknowledgment message to the host 100 and does not create any namespace or logically partition the non-volatile storage medium 220 according to the create command.

Thereafter, step S210: creating a global H2F mapping table according to the create command; wherein the total number of the global H2F mapping tables is independent of the namespace number indicated in the set values, and the size of the global H2F mapping table is proportional to the sum of the capacity of each namespace indicated in the set values. Specifically, assuming that the maximum number of supportable namespaces indicated in the support parameters is 4 and the namespace number indicated in the set values is also 4, according to the prior art the control unit 210 would partition the non-volatile storage medium 220 into four areas to create four namespaces (e.g., namespaces #0 to #3) and create a H2F mapping table for each of the namespaces (e.g., H2F mapping tables #0 to #3) according to the create command. As shown in FIG. 3, the control unit 210 of the prior art creates the four H2F mapping tables #0 to #3 corresponding to the four namespaces #0 to #3, respectively. However, in the present invention the control unit 210 neither create the four namespaces #0 to #3, logically partition the non-volatile storage medium 220, nor create the H2F mapping tables #0 to #3 for the namespaces #0 to #3 according to the create command. Instead, the control unit 210 creates a global H2F mapping table to collectively manage the data stored in the namespaces #0 to #3.

FIG. 4 is a global H2F mapping table created by the control unit 210 in accordance with an embodiment of the present invention. The size of the global H2F mapping table is proportional to the sum of the capacity of each namespace indicated in the set values. The global H2F mapping table can be partitioned into a plurality of sectors, and the total number of sectors is equal to the namespace number indicated in the create command. For example, the global H2F mapping table is partitioned into four sectors, and each sector corresponds to one namespace. Assuming that each of the namespace capacities indicated in the set values is identical, the length of each sector in the global H2F mapping table would also be identical. Assuming that each record of data in the global H2F mapping table has a size of 8 B for recording a correspondence of 4K data from the host 100 and that each of the namespaces to be created #0 to #3 has a capacity of 64 MB for recording 16,384 records of data, the total capacity of the namespaces #0 to #3 would be 256 MB, and the global H2F mapping table created in step S210 would have a size of 512 KB and record the correspondence between the 65,536 LBAs (e.g., LBA0 to LBA65535) and the physical address (e.g., block ID and page ID). The 65,536 LBAs are preferably sequentially arranged and sequentially mapped to the namespaces #0 to #3 to be created. For example, the first sector includes LBA0 to LBA16383, which correspond to the logical block addresses LBA0 to LBA16383 of the namespace #0 respectively; the second sector includes LBA16384 to LBA32767, which correspond to the logical block addresses LBA0 to LBA16383 of the namespace #1 respectively; the third sector includes LBA32768 to LBA49151, which correspond to the logical block addresses LBA0 to LBA16383 of the namespace #2 respectively; and the fourth sector includes LBA49152 to LBA65535, which correspond to the logical block addresses LBA0 to LBA16383 of the namespace #3 respectively.

The method for creating multi-namespace of the present invention is able to simplify the creation of multi-namespace and facilitates efficient access and management of data in the multi-namespace. Therefore, the system resource can support multiple namespaces without having to be partitioned, thereby achieving the objective of the present invention. In addition, when the host 100 wishes to add a namespace, delete a namespace or reset the namespace capacity, the same effect can be achieved by properly adjusting the contents of the global H2F mapping table according to the method for creating multi-namespace of the present invention.

Figure 5:
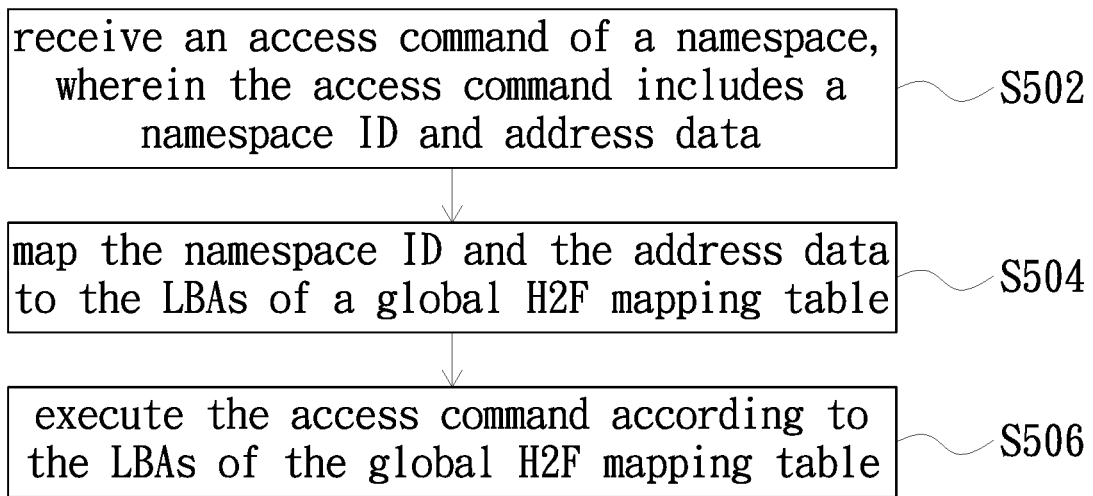
FIG. 5 is a flow chart of a method for accessing data in a multi-namespace in accordance with an embodiment of the present invention.

After creating the global H2F mapping table according to the create command, the control unit 210 accesses and manages the data in the multi-namespace according to the global H2F mapping table. FIG. 5 is a flow chart of a method for accessing data in a multi-namespace in accordance with an embodiment of the present invention. Please refer to FIGS. 1, 4 and 5. First, step S502: receiving an access command of a namespace, wherein the access command includes a namespace identifier (namespace ID) and address data. Specifically, the namespace ID corresponds to one of a plurality of namespaces; the address data is preferably a value (e.g., an LBA), or two values (e.g., a first LBA and a second LBA) respectively representing the start address and the end address of a record of data, or an LBA and a quantity respectively representing the starting address of a record of data and the total number of records of data. In the following description, the access command is described as an example of reading the data of LBA1 of the namespace #1, but the present invention is not limited thereto.

Thereafter, step S504: mapping the namespace ID and the address data to the LBAs of the global H2F mapping table. Specifically, the control unit 210 maps the namespace ID and the address data to the LBAs of the global H2F mapping table according to the conversion formula as follows:

LBA of the global H2F mapping table=sum of capacities of all of the namespaces that are smaller than the namespace ID+address data In example, assuming that the namespace ID is 1 (i.e., corresponding to the namespace #1), the namespaces before the namespace #1 would include only the namespace #0, and accordingly the capacity of the namespace #0 would correspond to 16,384 LBAs (i.e., LBA0 to LBA16383) and the address data would be LBA1. Therefore, according to the above conversion formula, the LBA16385 (=16384+1) of the global H2F mapping table is obtained. In another example, assuming that the namespace ID is 2 and the address data is LBA10 to LBA20 (i.e., corresponding to LBA10 to LBA20 of namespace #2), the namespaces before the namespace #2 would include the namespaces #0 to #1, and the capacity of the namespaces #0 to #1 would each corresponds to 16,384 LBAs. Therefore, according to the above conversion formula, the LBA32778 (=16384×2+10) to LBA32788 (=16384×2+20) of the global H2F mapping table are obtained.

Thereafter, step S506: executing the access command according to the LBAs of the global H2F mapping table. Specifically, the LBA1 of the namespace #1 corresponds to the LBA16385 of the global H2F mapping table; therefore, the control unit 210 can obtain the block identifier (block ID) and page identifier (page ID) by reading the LBA16385 of the global H2F mapping table and complete the access command by reading the page corresponding to the page ID of the block corresponding to the block ID. Similarly, the LBA10 to LBA20 of the namespace #2 corresponds to the LBA32778 to LBA32788 of the global H2F mapping table; therefore, the control unit 210 can obtain the block ID and page ID by reading the LBA32778 to LBA32788 of the global H2F mapping table and complete the access command by reading the page corresponding to the page ID of the block corresponding to the block ID.

According to the teachings of the above embodiments, the present invention uses a global H2F mapping table to collectively manage a plurality of namespaces in a data storage device; therefore, not only the multi-namespace is effectively supported but the management of multi-namespace is also facilitated. Further, the present invention prevents system resources (e.g., spare spaces) from being partitioned for supporting the multi-namespace, thereby avoiding insufficiency or limiting of the system resources.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for creating a multi-namespace and accessing data in the multi-namespace, comprising:

returning information of a namespace data structure according to a query command, wherein the information of the namespace data structure comprises a maximum number and a total capacity of supportable namespace;

receiving and determining whether a create command for creating a plurality of namespaces is correct, wherein the create command comprises a number of a namespace and a capacity of the namespace;

if the determination is correct, creating a global host logical-flash physical address (H2F) mapping table according to the create command, wherein a number of the global H2F mapping tables is independent of the maximum number of the supportable namespaces and the number of namespace;

receiving an access command of a namespace, wherein the access command comprises a namespace identifier (namespace ID) and address data;

mapping the namespace ID and the address data to a logical block address (LBA) of the global H2F mapping table; and executing the access command according to the LBA.

2. The method for creating a multi-namespace and accessing data in the multi-namespace according to claim 1, wherein the namespace ID corresponds to one of the plurality of namespace.

3. The method for creating a multi-namespace and accessing data in the multi-namespace according to claim 1, wherein the address data comprises the LBA.

4. The method for creating a multi-namespace and accessing data in the multi-namespace according to claim 1, wherein the address data comprises a first LBA and a second LBA.

5. The method for creating a multi-namespace and accessing data in the multi-namespace according to claim 1, wherein the address data comprises the LBA and a total number of records of data.

6. The method for creating a multi-namespace and accessing data in the multi-namespace according to claim 1, wherein the step of mapping the namespace ID and the address data to a LBA of a global H2F mapping table comprises:

equaling the LBA of the global H2F mapping table to a sum of capacities of namespaces smaller than the namespace ID plus the address data.

* * * * *